(12) United States Patent
Nagase et al.

(10) Patent No.: US 9,406,448 B2
(45) Date of Patent: Aug. 2, 2016

(54) ELECTRODE FOR ELECTROCHEMICAL DEVICE, ELECTROCHEMICAL DEVICE, AND METHOD FOR MANUFACTURING ELECTRODE FOR ELECTROCHEMICAL DEVICE

(71) Applicant: TAIYO YUDEN CO., LTD., Taito-ku, Tokyo (JP)

(72) Inventors: Takatoshi Nagase, Takasaki (JP); Naoto Hagiwara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 204 days.

(21) Appl. No.: 14/227,727

(22) Filed: Mar. 27, 2014

(65) Prior Publication Data
US 2014/0347788 A1 Nov. 27, 2014

(30) Foreign Application Priority Data

May 24, 2013 (JP) ................................. 2013-110217

(51) Int. Cl.
*H01G 9/15* (2006.01)
*H01G 11/28* (2013.01)
*H01G 11/86* (2013.01)

(52) U.S. Cl.
CPC ............... *H01G 11/28* (2013.01); *H01G 11/86* (2013.01); *H01G 9/15* (2013.01); *Y02E 60/13* (2013.01)

(58) Field of Classification Search
CPC ........ H01G 9/155; H01G 11/66; H01G 11/70
See application file for complete search history.

(56) References Cited

U.S. PATENT DOCUMENTS

| 6,031,712 | A | * | 2/2000 | Kurihara | H01G 9/155 29/25.03 |
| 6,426,863 | B1 | * | 7/2002 | Munshi | H01G 9/038 361/503 |
| 2001/0028546 | A1 | * | 10/2001 | Kasahara | H01G 9/02 361/512 |
| 2002/0154467 | A1 | * | 10/2002 | Nakazawa | H01G 9/155 361/302 |
| 2003/0081372 | A1 | * | 5/2003 | Nakazawa | H01G 9/155 361/502 |
| 2003/0129489 | A1 | * | 7/2003 | Kamisuki | H01G 9/155 429/185 |
| 2006/0175006 | A1 | * | 8/2006 | Takahashi | H01G 9/10 156/308.2 |
| 2011/0116211 | A1 | * | 5/2011 | Watanabe | H01G 9/016 361/502 |

FOREIGN PATENT DOCUMENTS

| JP | 2008-108464 A | 5/2008 |
| JP | 2008-192727 A | 8/2008 |
| JP | 2009-016721 A | 1/2009 |
| JP | 2013-098022 A | 5/2013 |

OTHER PUBLICATIONS

A Notice of Reasons for Refusal issued by Japanese Patent Office, mailed Jul. 16, 2013, for Japanese counterpart application No. 2013-110217.

* cited by examiner

*Primary Examiner* — Dion R Ferguson
(74) *Attorney, Agent, or Firm* — Law Office of Katsuhiro Arai

(57) ABSTRACT

An electrode for an electrochemical device includes a current collector, electrode layer, and active material layer. The electrode layer is formed on the current collector and contains an active material. The active material layer is formed in an area on the current collector where the electrode layer is not formed, and contains an active material. The electrode is capable of reducing the leak current while improving the device reliability.

8 Claims, 6 Drawing Sheets

Fig. 3
(a)
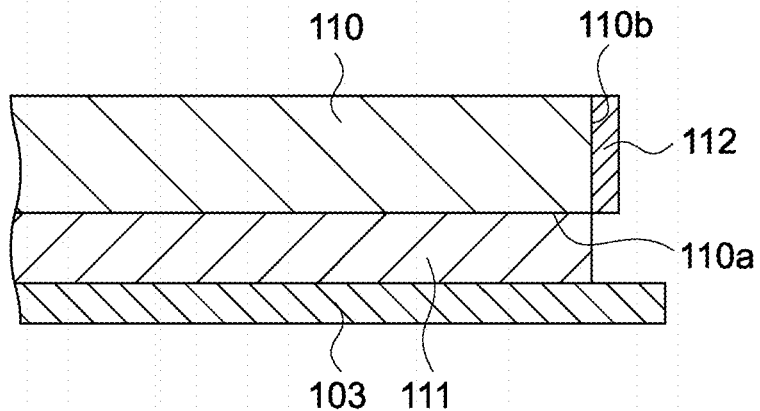
(b)
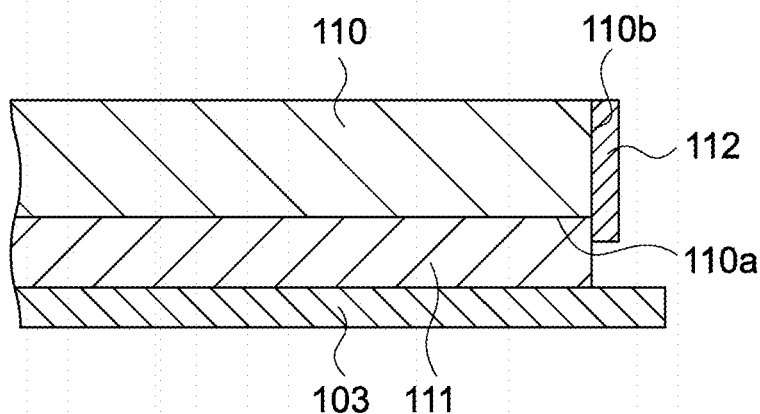
(c)
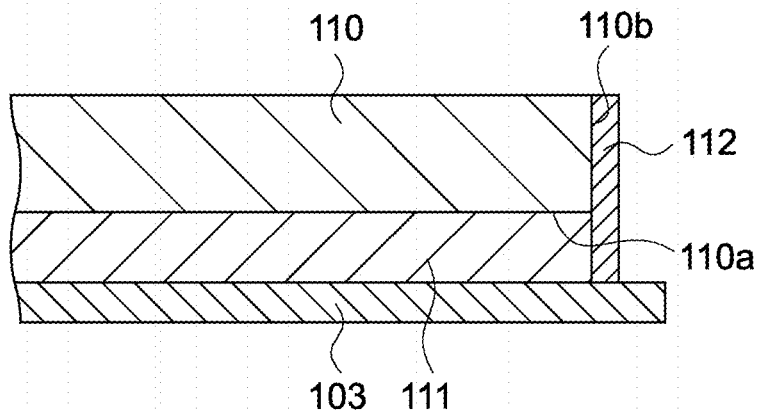

ELECTRODE FOR ELECTROCHEMICAL DEVICE, ELECTROCHEMICAL DEVICE, AND METHOD FOR MANUFACTURING ELECTRODE FOR ELECTROCHEMICAL DEVICE

FIELD OF THE INVENTION

The present invention relates to an electrode for an electrochemical device containing active material, an electrochemical device, and a method for manufacturing an electrode for an electrochemical device.

DESCRIPTION OF THE RELATED ART

An electric double-layer capacitor comprises a positive electrode and negative electrode facing each other via a separator and sealed together with electrolyte. When voltage is applied between the positive electrode and negative electrode, electrical double layers are formed at the positive electrode and negative electrode and electrical charges are accumulated. The electrodes (positive electrode and negative electrode) are generally made of electrode layers containing active carbon or other active material that are stacked on top of a metal foil or other current collector, where active carbon with large surface area is often used for the active material.

Here, how to suppress self-discharge is one problem associated with these electric double-layer capacitors. Self-discharge is a phenomenon where the electrical charges accumulated at the positive electrode and negative electrode decrease gradually in a charged state, thereby reducing the electrical charges available for discharge.

For example, Patent Literature 1 discloses a structure wherein sealing materials are provided along the long sides of a current collector. It is claimed that this structure can suppress the leak current that would otherwise generate between the positive electrode and negative electrode that are placed adjacent to each other. Additionally, Patent Literature 2 discloses a structure wherein oxide layers are formed in areas of a current collector where active material layers are not formed. It is claimed that this structure can prevent the self-discharge that would otherwise occur as the constituent material of current collector elutes into the electrolyte.

BACKGROUND ART LITERATURES

[Patent Literature 1] Japanese Patent Laid-open No. 2008-192727
[Patent Literature 2] Japanese Patent Laid-open No. 2008-108464

SUMMARY

Here, leak current that can cause self-discharge results for various reasons, one of which is a reaction between the current collector and electrolyte. The charge current comprises a stack of electrode layers containing active material as mentioned above, where, on the surface of the current collector, areas not covered by any electrode layer are in contact with the electrolyte and therefore leak current may generate in these areas due to a reaction between the current collector and electrolyte. In addition, current may concentrate at the edges of the electrodes, causing the reliability of the device to drop.

The constitution described in Patent Literature 1 is such that sealing materials are provided on the current collector, but since there are areas not covered by the sealing materials, leak current may generate due to a reaction between the current collector and electrolyte. Under the constitution described in Patent Literature 2, on the other hand, oxide layers are formed to prevent the constituent material of the current collector from eluting, and not to prevent leak current due to a reaction between the current collector and electrolyte. In addition, neither of these constitutions resolves the aforementioned problem of drop in device reliability caused by concentration of current.

In light of the situations mentioned above, an object of the present invention is to provide an electrode for an electrochemical device capable of reducing the leak current while improving the device reliability, an electrochemical device, and a method for manufacturing an electrode for an electrochemical device.

To achieve the aforementioned object, an electrode for electrochemical device pertaining to an embodiment of the present invention comprises a current collector, electrode layer, and active material layer.

The electrode layer is formed on the current collector and contains an active material.

The active material layer is formed in an area on the current collector where the electrode layer is not formed, and contains the active material.

To achieve the aforementioned object, an electrochemical device pertaining to an embodiment of the present invention comprises a first electrode, second electrode, and separator.

The first electrode comprises a first current collector, a first electrode layer containing an active material and formed on the first current collector, and a first active material layer containing the active material and formed in an area on the first current collector where the first electrode layer is not formed.

The second electrode comprises a second current collector, a second electrode layer containing an active material and formed on the second current collector, and a second active material layer containing the active material and formed in an area on the second current collector where the second electrode layer is not formed.

The separator is placed between the first electrode and second electrode to prevent the first electrode layer and second electrode layer from contacting each other.

To achieve the aforementioned object, a method for manufacturing an electrode for an electrochemical device pertaining to an embodiment of the present invention comprises forming an electrode layer containing active material on a current collector.

An active material layer containing active material is formed in an area on the current collector where the electrode layer is not formed.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

DESCRIPTION OF THE SYMBOLS

100—Electrochemical device
101—Positive electrode
102—Negative electrode
103—Separator
110—Positive electrode current collector
110a—Main face
110b—Side face
111—Positive electrode layer
112—Positive electrode active material layer
113—Negative electrode current collector
113a—Main face
113b—Side face
114—Negative electrode layer
115—Negative electrode active material layer

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 3 consists of (a), (b), and (c) illustrating schematic views of a positive electrode of an electrochemical device according to embodiments of the present invention.

DETAILED DESCRIPTION OF EMBODIMENTS

Figure 1:
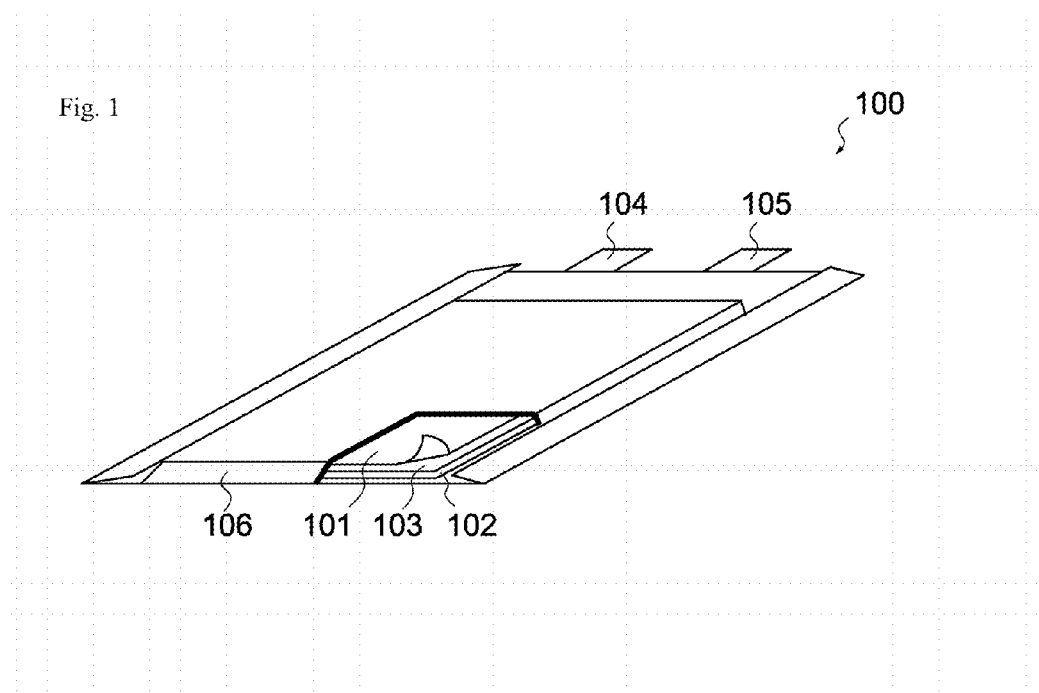
FIG. 1 is a perspective view of an electrochemical device pertaining to an embodiment of the present invention.

The electrode for an electrochemical device pertaining to an embodiment of the present invention comprises a current collector, electrode layer, and active material layer.

The electrode layer is formed on the current collector and contains an active material.

The active material layer is formed in an area on the current collector where the electrode layer is not formed, and contains the active material.

According to this constitution, the active material layer is formed in an area on the current collector where the electrode layer is not formed, which prevents the current collector from contacting the electrolyte. This suppresses a film-forming reaction that would otherwise occur on the surface of the current collector as the current collector contacts the electrolyte, and reduces the leak current as a result. In addition, electrical charges can be stored in the active material contained in the active material layer, thereby mitigating the concentration of current at the edges of the electrode layer and consequently improving the device reliability.

The electrode for an electrochemical device may be such that the current collector has a main face and side face, and the electrode layer is formed on the main face, while the active material layer is formed on the side face.

If the current collector is a foil, sheet, etc., the electrode layer is formed on the main face of the current collector, in which case the side face of the current collector is exposed and undergoes a film-forming reaction with the electrolyte. Under the aforementioned constitution, on the other hand, formation of the active material layer on the side face of the current collector not only prevents such film-forming reaction on the side face of the current collector, but also mitigates the concentration of current at the edges of the electrode layer.

The electrochemical device pertaining to an embodiment of the present invention comprises a first electrode, second electrode, and separator.

The first electrode comprises a first current collector, a first electrode layer containing an active material and formed on the first current collector, and a first active material layer containing the active material and formed in an area on the first current collector where the first electrode layer is not formed.

The second electrode comprises a second current collector, a second electrode layer containing an active material and formed on the second current collector, and a second active material layer containing the active material and formed in an area on the second current collector where the second electrode layer is not formed.

The separator is placed between the first electrode and second electrode to prevent the first electrode layer and second electrode layer from contacting each other.

According to this constitution, the first active material layer of the first electrode and second active material layer of the second electrode can reduce the leak current and improve the device reliability as mentioned above.

The method for manufacturing an electrode for an electrochemical device pertaining to an embodiment of the present invention comprises forming an electrode layer containing active material on a current collector.

An active material layer containing active material is formed in an area on the current collector where the electrode layer is not formed.

According to this manufacturing method, an electrode for an electrochemical device can be manufactured wherein an electrode layer and active material layer are formed on a current collector.

The step to form the electrode layer may comprise applying a slurry containing active material and binder on the main face of the current collector, while the step to form the active material layer may comprise applying an active material solution containing active material on the side face of the current collector.

According to this manufacturing method, the electrode layer can be formed on the main face of the current collector and the active material layer, on the side face of the current collector.

The electrochemical device pertaining to an embodiment of the present invention is explained. The electrochemical device pertaining to this embodiment is assumed to be an electric double-layer capacitor.

Structure of Electrochemical Device

Figure 2:
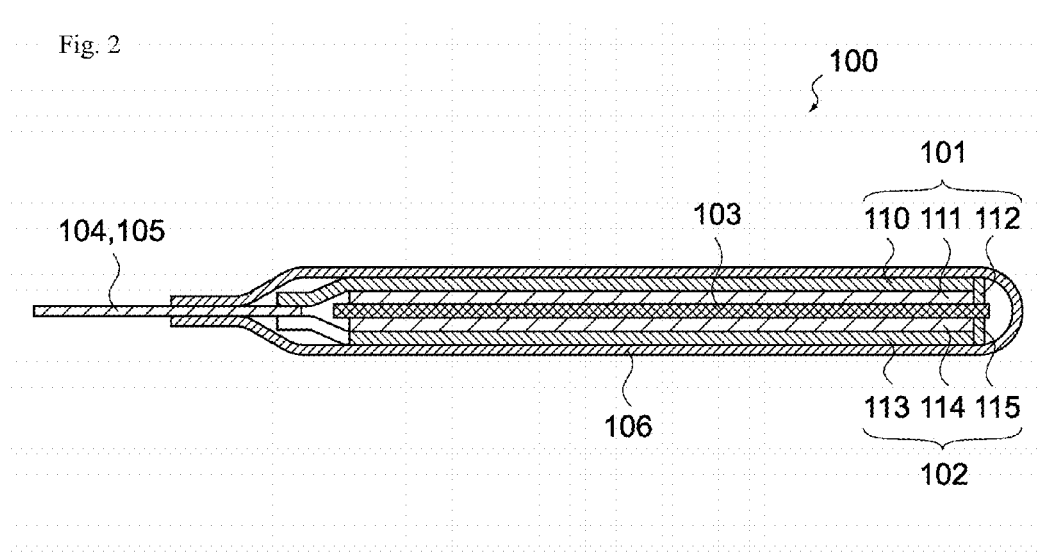
FIG. 2 is a section view of the electrochemical device.

FIG. 1 is a perspective section view of an electrochemical device 100 pertaining to this embodiment, while FIG. 2 is a section view of the electrochemical device 100.

As shown in these figures, the electrochemical device 100 has a positive electrode 101, negative electrode 102, separator 103, positive electrode terminal 104, negative electrode terminal 105, and film package 106. The positive electrode 101 and negative electrode 102 are facing each other via the separator 103, and housed in the film package 106. The positive electrode terminal 104 connects to the positive electrode 101, while the negative electrode terminal 105 connects to the negative electrode 102, and both are led out from the film package 106. Electrolyte is sealed in the film package 106.

In FIGS. 1 and 2, one positive electrode 101 and one negative electrode 102 are provided, but two or more of them can be provided. In this case, the positive electrodes 101 and negative electrodes 102 are stacked via the separators 103. Also, the electrochemical device 100 may comprise a rolled laminate of positive electrodes 101, negative electrodes 102 and separators 103.

The positive electrode 101 functions as the positive electrode of the electrochemical device 100. FIG. 3 consists of enlarged section views of the positive electrode 101 and separator 103. As shown in FIGS. 2 and 3, the positive electrode 101 comprises a positive electrode current collector 110, positive electrode layer 111, and positive electrode active material layer 112. (a) to (c) in FIG. 3 show patterns in which the positive electrode active material layer 112 can be formed.

The positive electrode current collector 110 may be a foil made of metal or other conductive material, such as an aluminum foil. As shown in FIG. 3, the positive electrode current collector 110 has a main face 110a and side face 110b. The main face 110a is a surface (front or back side) extending along the direction vertical to the thickness direction of the positive electrode current collector 110, while the side face 110b is a surface (end face) extending along the thickness direction of the positive electrode current collector 110.

The positive electrode layer 111 is a layer containing active material and formed on the main face 110a of the positive electrode current collector 110. To be specific, the positive electrode layer 111 may comprise an active material and binder, as a mixture of active carbon being the active material and synthetic resin being the binder. If separators 103 are layered both on the front side and back side of the positive electrode 101, then the positive electrode layer 111 can be provided not only on the main face 110a, but also on the back side.

The positive electrode active material layer 112 is a layer containing active material and formed on the side face 110b of the positive electrode current collector 110. The active material contained in the positive electrode active material layer 112 may be the same active carbon used as the active material contained in the positive electrode layer 111. The positive electrode active material layer 112 may be provided only on the side face 110b as shown in (a) in FIG. 3, or it may be provided in a manner continuing from the side face 110b to the side face of the positive electrode layer 111 as shown in (c) in FIG. 3. As shown in (b) in FIG. 3, it can also be provided over the side face 110b and part of the side face of the positive electrode layer 111.

Figure 4:
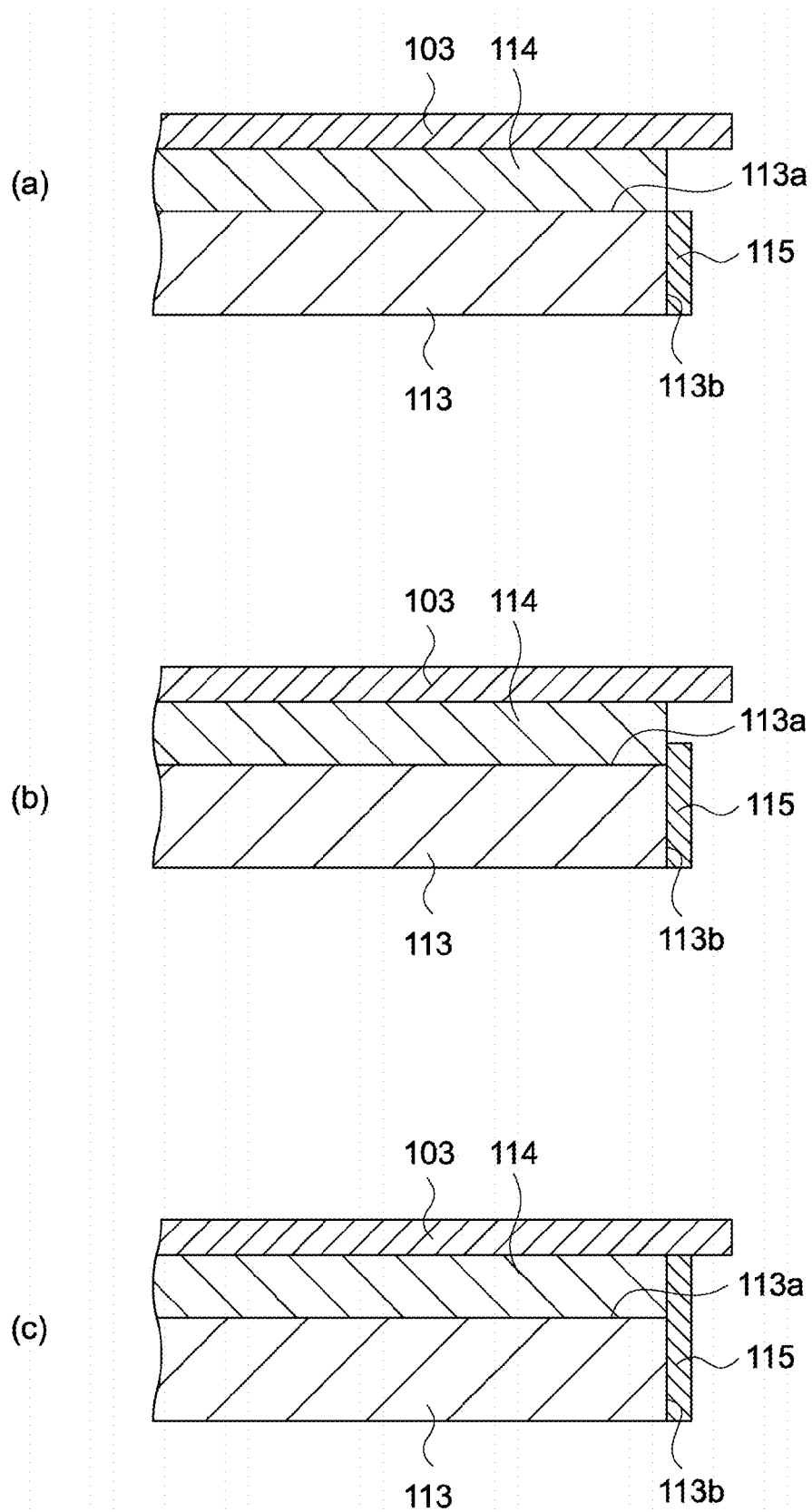
FIG. 4 consists of (a), (b), and (c) illustrating schematic views of a negative electrode of an electrochemical device according to embodiments of the present invention.

The negative electrode 102 functions as the negative electrode of the electrochemical device 100. FIG. 4 consists of enlarged section views of the negative electrode 102 and separator 103. As shown in FIGS. 2 and 4, the negative electrode 102 comprises a negative electrode current collector 113, negative electrode layer 114, and negative electrode active material layer 115. (a) to (c) in FIG. 4 show patterns in which the negative electrode layer 114 can be formed.

The negative electrode current collector 113 may be a foil made of metal or other conductive material, such as an aluminum foil. As shown in FIG. 4, the negative electrode current collector 113 has a main face 113a and side face 113b. The main face 113a is a surface (front or back side) extending along the direction vertical to the thickness direction of the negative electrode current collector 113, while the side face 113b is a surface (end face) extending along the thickness direction of the negative electrode current collector 113.

The negative electrode layer 114 is a layer containing active material and formed on the main face 113a of the negative electrode current collector 113. To be specific, the negative electrode layer 114 may comprise an active material and binder, as a mixture of active carbon being the active material and synthetic resin being the binder. If separators 103 are layered both on the front side and back side of the negative electrode 102, then the negative electrode layer 114 can be provided not only on the main face 113a, but also on the back side.

The negative electrode active material layer 115 is a layer containing active material and formed on the side face 113b of the negative electrode current collector 113. The active material contained in the negative electrode active material layer 115 may be the same active carbon used as the active material contained in the negative electrode layer 114. The negative electrode active material layer 115 may be provided only on the side face 113b as shown in (a) in FIG. 4, or it may be provided in a manner continuing from the side face 113b to the side face of the negative electrode layer 114 as shown in (c) in FIG. 4. As shown in (b) in FIG. 3, it can also be provided over the side face 113b and part of the side face of the negative electrode layer 114.

The separator 103 is placed between the positive electrode 101 and negative electrode 102 to let the electrolyte pass through it, while preventing the positive electrode layer 111 and negative electrode layer 114 from contacting each other (insulating the two). The separator 103 may be a woven fabric, nonwoven fabric, synthetic resin-based microporous membrane, etc.

The positive electrode terminal 104 is electrically connected to the positive electrode current collector 110 and functions as the terminal of the positive electrode 101. The positive electrode terminal 104 may be a foil or wire material made of conductive material.

The negative electrode terminal 105 is electrically connected to the negative electrode current collector 113 and functions as the terminal of the negative electrode 102. The negative electrode terminal 105 may be a foil or wire material made of conductive material.

The film package 106 houses and seals the positive electrode 101, negative electrode 102, separator 103 and electrolyte. The film package 106 may be a sheet made of insulating material, such as an aluminum laminate material. Also, a case, etc., made of synthetic resin may be used instead of the film package 106.

The electrolyte sealed in the film package 106 is not limited in any way, so long as it contains anions and cations. For example, $SBP.BF_4$ (5-azoniaspiro[4.4] nonane tetrafluoroborate)/PC (propylene carbonate) can be used, among others.

The electrochemical device 100 has the above constitution. Here, the positive electrode active material layer 112 is provided on the positive electrode 101, while the negative electrode active material layer 115 is provided on the negative electrode 102, but an active material layer can also be provided only on either the positive electrode 101 or the negative electrode 102. However, preferably an active material layer is provided on both the positive electrode 101 and negative electrode 102, as the effects (described later) of the active material layer become greater.

Operation and Effects of Electrochemical Device

The electrochemical device 100 operates as follows. When the positive electrode terminal 104 and negative electrode terminal 105 are connected to an external power supply and charging is started, the anions in the electrolyte migrate to the positive electrode 101 and adsorb onto the active material surface of the positive electrode layer 111 to form electrical double layers. At the same time, the cations in the electrolyte migrate to the negative electrode 102 and adsorb onto the active material surface of the negative electrode layer 114 to form electrical double layers. As a result, electrical charges are accumulated in the positive electrode 101 and negative electrode 102, respectively. At the time of discharge, the electrical double layers are eliminated at the positive electrode 101 and negative electrode 102, while current is drawn from the positive electrode terminal 104 and negative electrode terminal 105. The aforementioned charge/discharge cycle is repeated in the electrochemical device 100.

Here, general electrochemical devices undergo a phenomenon called "self-discharge" whereby, in a charged state where electrical charges are accumulated in the positive electrode and negative electrode, the accumulated electrical charges decrease gradually. One cause of self-discharge is a film-forming reaction occurring where the positive and negative electrode current collectors contact the electrolyte, resulting in a flow of current (leak current).

Figure 5:
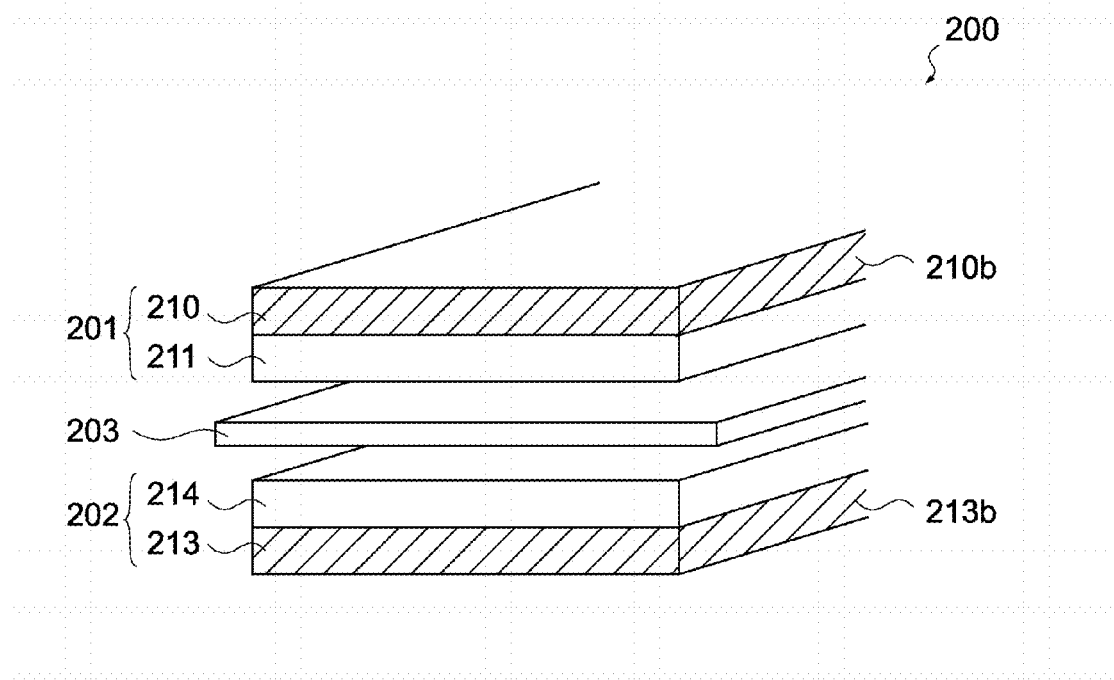
FIG. 5 is a schematic exploded perspective view of an electrochemical device according to a comparative example of the present invention.

FIG. 5 is an exploded perspective view of a general electrochemical device 200 (comparative example). The electrochemical device 200 has a positive electrode 201, negative electrode 202, and separator 203. The positive electrode 201 is constituted by a positive electrode current collector 210 and positive electrode layer 211, while the negative electrode 202 is constituted by a negative electrode current collector 213 and negative electrode layer 214. A side face 210b (shaded in the figure) of the positive electrode current collector 210 and a side face 213b (shaded in the figure) of the negative electrode current collector 213 are in contact with the electrolyte, and leak current generates in these areas.

On the other hand, the electrochemical device 100 pertaining to this embodiment has the positive electrode active material layer 112 formed on the side face 110b of the positive electrode current collector 110, to prevent the side face 110b from contacting the electrolyte. At the same time, the negative electrode active material layer 115 is formed on the side face 113b of the negative electrode current collector 113, to prevent the side face 113b from contacting the electrolyte. This way, direct contact of the positive electrode current collector 110 and negative electrode current collector 113 with the electrolyte can be prevented to suppress the film-forming reaction, thereby reducing the leak current (refer to "Examples").

Figure 6:
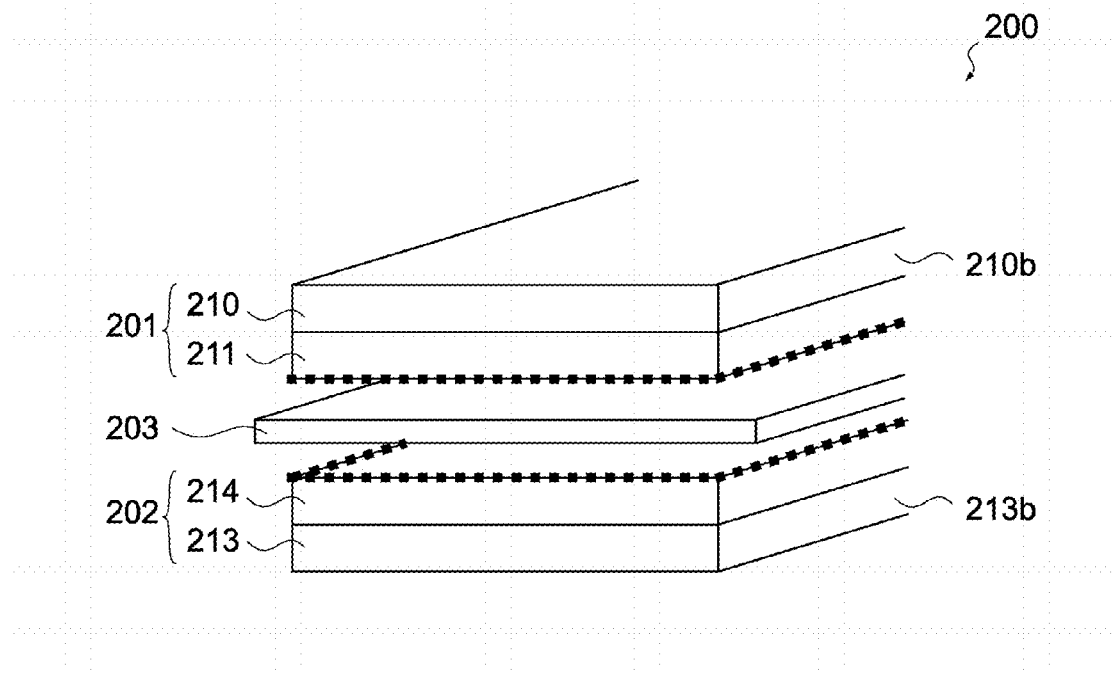
FIG. 6 is a schematic exploded perspective view of the electrochemical device showing current-concentrating edges with chain lines.

Furthermore, the electrochemical device 100 can mitigate the concentration of current at the edges of the electrode layer. FIG. 6 is an exploded perspective view of the electrochemical device 200. At the time of charge, current concentrates at the edges of the positive electrode layer 211 and negative electrode layer 214. FIG. 6 shows the current-concentrating edges of the positive electrode layer 211 and negative electrode layer 214 by chain lines.

With the electrochemical device 100, on the other hand, the positive electrode active material layer 112 and negative electrode active material layer 115 are formed and electrical charges can be stored in the active material contained in these active material layers. This prevents the concentration of current at the edges of the electrode layers.

In other words, the electrochemical device 100 mitigates the concentration of current at the edges of the positive electrode layer 111 and edges of the negative electrode layer 114 compared to the comparative structure (electrochemical device 200). As described, the electrochemical device 100 having the positive electrode active material layer 112 and negative electrode active material layer 115 can mitigate the concentration of current at the edges of the positive electrode layer 111 and negative electrode layer 114 to improve the device reliability.

Method for Manufacturing Electrochemical Device

The method for manufacturing the electrochemical device 100 is explained. Since the positive electrode 101 and negative electrode 102 of the electrochemical device 100 can both be an electrode of the same constitution, how this electrode (electrode 150) is produced is also explained.

Figure 7:
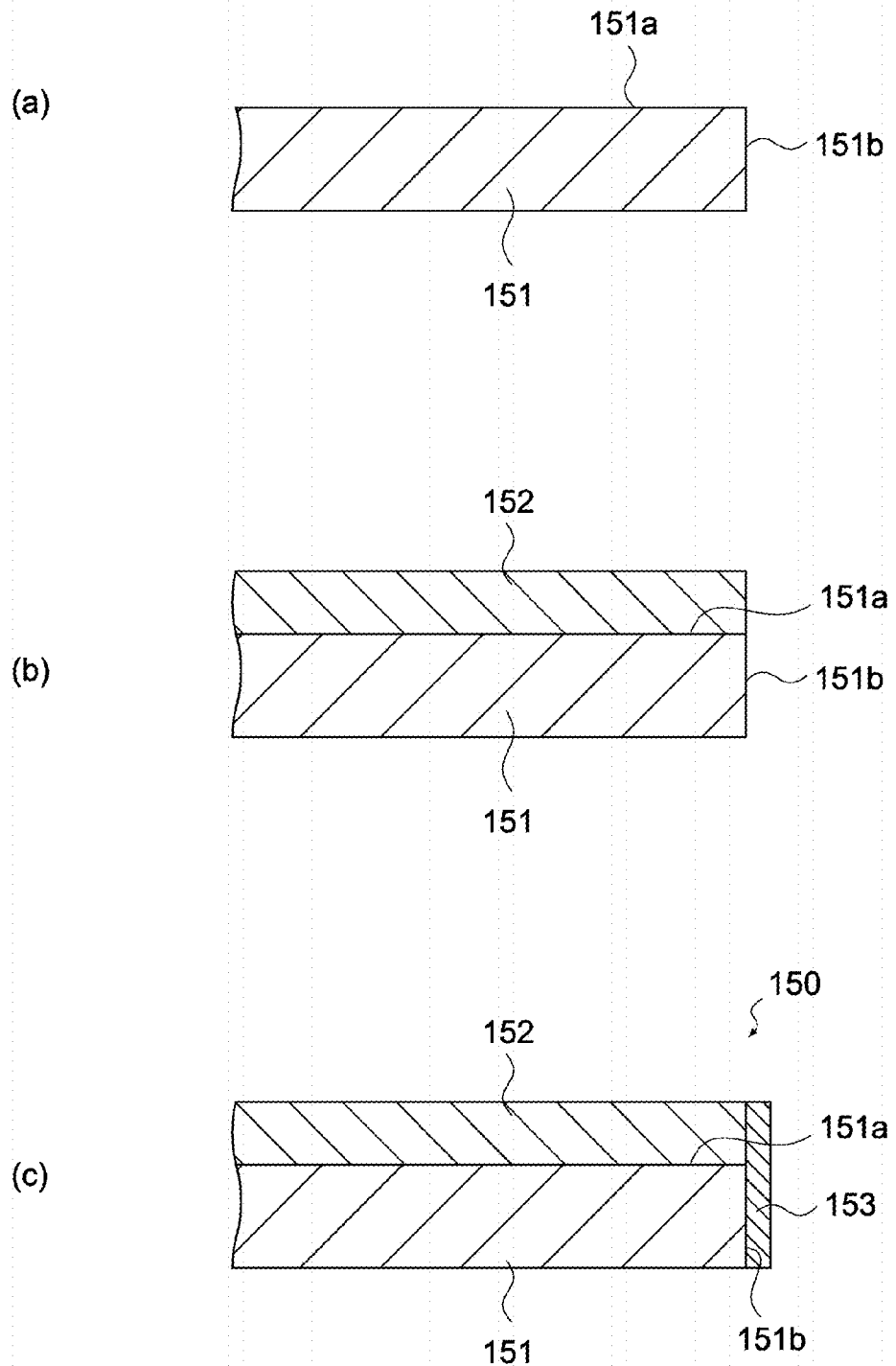
FIG. 7 consists of (a), (b), and (c) illustrating schematic views of a method for manufacturing an electrochemical device according to an embodiment of the present invention.

FIG. 7 shows schematic views illustrating the method for manufacturing the electrode 150. As shown in (a) in FIG. 7, a current collector 151 in the form of an aluminum foil, etc., is prepared. The current collector 151 can have any thickness, but it can be 20 µm thick, for example.

Next, a slurry is applied on a main face 151a of the current collector 151. The slurry may be a mixture of active carbon or other active material with synthetic resin or other binder. This way, an electrode layer 152 is formed on the main face 151a of the current collector 151, as shown in (b) in FIG. 7. The electrode layer 152 can have any thickness, but it can be 10 µm thick, for example. The current collector 151 on which the electrode layer 152 is formed is cut to a specified size, if necessary.

Next, an active material solution is applied on a side face 151b of the current collector 151. The active material solution may be methanol or other volatile liquid in which active carbon or other active material is dispersed. Here, the degree of adhesion of the active material to the side face 151b can be adjusted by changing the dispersion concentration of the active material in the active material solution. The active material solution can be applied by rolling a roller impregnated with the active material solution over the side face 151b. This way, an active material layer 153 is formed on the side face 151b of the current collector 151, as shown in (c) in FIG. 7. When this occurs, an active material layer 153 may or may not be formed on the side face of the electrode layer 152.

The electrodes 150 thus produced are layered as the positive electrode 101 and negative electrode 102 with the separator 103 (refer to FIG. 2). This layering is done in such a way that the positive electrode layer 111 and negative electrode layer 114 are on the separator 103 side. Next, the positive electrode terminal 104 and negative electrode terminal 105 are connected to the positive electrode 101 and negative electrode 102, respectively, by means of ultrasonic welding, etc. The resulting laminate is dried by means of hot vacuum drying, etc., and housed in the film package 106. Electrolyte is injected into the film package 106 and sealed using sealing materials, etc. The electrochemical device 100 can be manufactured as above.

EXAMPLES

To check the effects of the electrochemical device explained in the aforementioned embodiment, the following electrochemical devices were produced, observed and tested.

Examples 1 and 2

A slurry mixture of active carbon being the active material, and carboxy methyl cellulose and styrene butadiene rubber being the binder, was applied on a current collector (aluminum foil, 20 µm thick) to produce an electrode layer (10 µm thick) as an electrode sheet. This electrode sheet was stamped with dies to make an electrode of specified dimensions.

Figure 8:
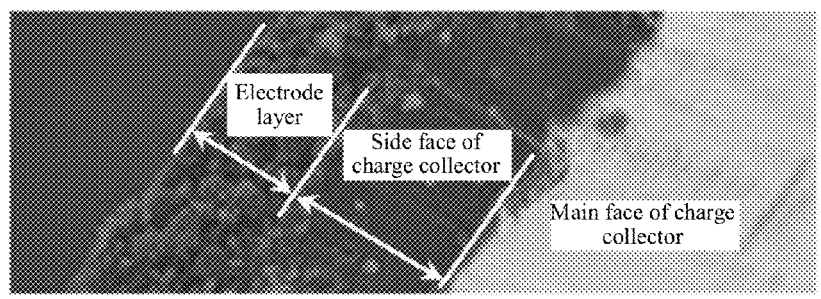
FIG. 8 is an electron microscope image of an electrochemical device in process of manufacture in an example of the present invention.

FIG. 8 is an electron microscope image of the electrode constituted by the current collector and the electrode layer formed thereon. In this stage, the side face of the current collector is exposed.

An active material solution prepared as a methanol solution in which an active material is dispersed was applied on the side face of the electrode using a rubber roller to produce an active material layer. In Examples 1 and 2, the dispersion concentration of the active material in the active material solution was varied to change the degree of adhesion of the active material. Note that the active material solution used in Example 1 has a higher concentration of active carbon. Electrodes, each constituted by the electrode layer formed on the main face of the current collector and the active material layer formed on the side face, were thus produced and used as the positive electrode and negative electrode.

The positive electrode and negative electrode were layered via the separator (cellulose separator, 30 µm thick). The separator had been cut to specified dimensions using a die. The positive electrode terminal and negative electrode terminal were connected to the positive electrode current collector and negative electrode current collector, respectively, by means of ultrasonic welding, etc. The resulting laminate was vacuum dried for 36 hours at 180° C.

The laminate was housed in an aluminum laminate encapsulation material and electrolyte was injected therein, and the sealed areas were thermally fused using sealing materials. $SBP.BF_4/PC$ (1.0 mol/L) was used for the electrolyte. An electrochemical device of approx. 20 mm×26 mm in size was thus produced.

Comparative Example 1

An electrochemical device was produced according to the production steps in Examples 1 and 2, except that the step to apply the active material solution on the side face of the current collector was skipped. As a result, the side face of the current collector remained exposed without any active material adhered to it.

Figure 9:
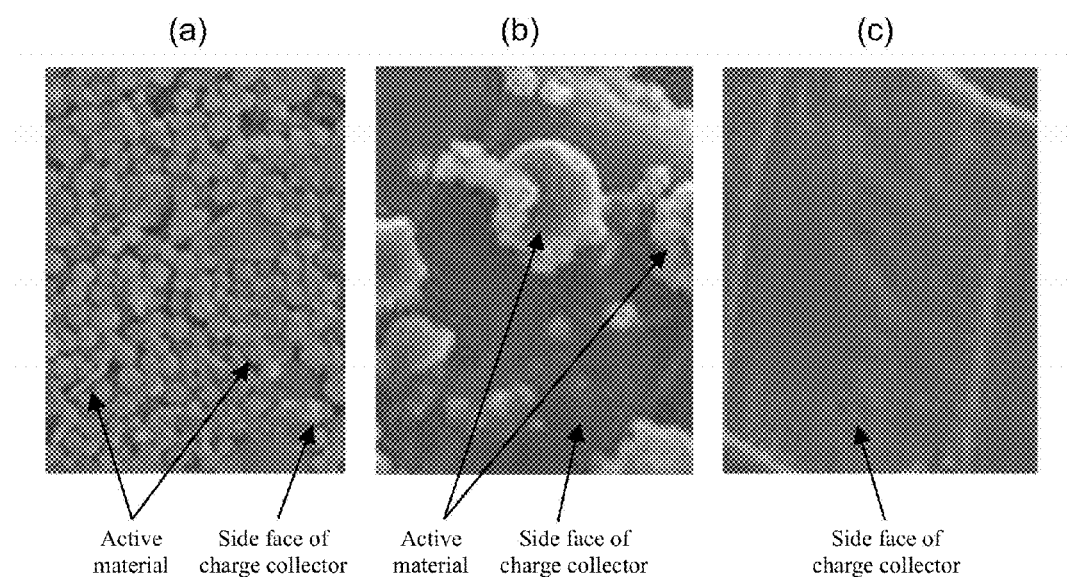
FIG. 9 consists of (a), (b), and (c) showing electron microscope images of electrochemical devices obtained in Example 1, Example 2, and Comparative Example 1 of the present invention, respectively.

FIG. 9 shows electron microscope images of the side faces of the current collectors of the electrodes pertaining to the examples and comparative example. In the image of Example 1 shown in (a) in FIG. 9, sufficient active material is adhered to the side face of the current collector and the side face of the current collector is little exposed. In the image of Example 2 shown in (b) in FIG. 9, active material is partially adhered to the side face of the current collector, but the side face of the current collector is also exposed. In the image of Comparative Example 1 shown in (c) in FIG. 9, no active material is adhered to the side face of the current collector and the side face of the current collector is exposed.

The electrochemical devices pertaining to Examples 1, 2, and Comparative Example 1 were measured for leak current, capacity, and internal resistance.

In the measurement of leak current, each electrochemical device was charged to 2.5 V and leak current was measured 1 hour later. In the capacity measurement, each electrochemical device was charged using a charge/discharge device for 10 minutes at 100 mA in the CCCV (constant current, constant voltage) mode to 2.5 V, and then discharged at 10 mA. Capacity was calculated from the slope of the discharge curve. In the measurement of internal resistance, impedance was measured at 1 kHz using impedance measuring equipment.

Example 1 resulted in an approx. 7% reduction in the leak current, 5% improvement of the capacity maintenance ratio, and 8% drop in the rate of increase in internal resistance, compared to Comparative Example 1. The improvement of device reliability was the result of reduced leak current, which in turn resulted from the covering of the side face of the current collector with sufficient active material.

Example 2 resulted in an approx. 4% reduction in the leak current, 4% improvement of the capacity maintenance ratio, and 6% drop in the rate of increase in internal resistance, compared to Comparative Example 1. The device reliability still improved, although the effects of reduced leak current were lessened because the active material was adhered to the side face of the current collector, but did not sufficiently cover the side face.

As mentioned above, the electrochemical devices pertaining to the present invention can reduce the leak current, while improving the device reliability, because the active material is adhered to the side face of the current collector. It is also shown that the greater the amount of active material adhered to the side face of the current collector, the greater the effects.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2013-110217, filed May 24, 2013, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electrode for an electrochemical device comprising:
   a current collector having a main face and side face;
   an electrode layer containing active material mixed with a binder, and formed on the main face of the current collector; and
   an active material layer consisting essentially of the active material and formed on the side face of the current collector where the electrode layer is not formed wherein a concentration of the active material is higher in the active material layer than that in the electrode layer.

2. An electrode for an electrochemical device according to claim 1, wherein the current collector and the electrode layer have side faces, respectively, which side faces are aligned in a thickness direction, and the active material layer is formed along the side face of the current collector.

3. An electrochemical device comprising:
   a first electrode comprising a first current collector having a main face and side face; a first electrode layer containing an active material mixed with a binder, and formed on the main face of the first current collector; and a first active material layer consisting essentially of the active material and formed on the side face of the first current collector where the first electrode layer is not formed wherein a concentration of the first active material is higher in the first active material layer than that in the first electrode layer;
   a second electrode comprising a second current collector having a main face and side face; a second electrode layer containing an active material mixed with a binder, and formed on the main face of the second current collector; and a second active material layer consisting essentially of the active material and formed on the side face of the second current collector where the second electrode layer is not formed wherein a concentration of the second active material is higher in the second active material layer than that in the second electrode layer; and
   a separator placed between the first electrode and second electrode to prevent the first electrode layer and second electrode layer from contacting each other.

4. A method for manufacturing an electrode for an electrochemical device comprising:
   providing a current collector having a main face and side face;
   forming an electrode layer containing an active material mixed with a binder on the main face of the current collector; and
   forming an active material layer consisting essentially of the active material on the side face of the current collector where the electrode layer is not formed wherein a concentration of the active material is higher in the active material layer than that in the electrode layer.

5. A method for manufacturing an electrode for an electrochemical device according to claim 4, wherein: the step to form the electrode layer comprises applying a slurry containing the active material and the binder on the main face of the current collector; and
   the step to form the active material layer comprises applying an active material solution of the active material on the side face of the current collector.

6. An electrode for an electrochemical device according to claim 1, wherein the active material layer consists of the active material.

7. An electrochemical device according to claim 3, wherein the first active material layer consists of the first active material, and the second active material layer consists of the second active material.

8. A method for manufacturing an electrode for an electrochemical device according to claim 4, wherein the active material layer consists of the active material.

* * * * *